(12) United States Patent
Binder et al.

(10) Patent No.: US 11,835,194 B2
(45) Date of Patent: Dec. 5, 2023

(54) LIGHTING DEVICE FOR A MOTOR VEHICLE

(71) Applicant: Bayerische Motoren Werke Aktiengesellschaft, Munich (DE)

(72) Inventors: Thomas Binder, Munich (DE); Sebastien Casenave, Munich (DE); Dominik Hart, Riemerling (DE); Katharina Santner, Munich (DE); Chunyue Zhai, Gauting (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/011,587

(22) PCT Filed: Sep. 8, 2021

(86) PCT No.: PCT/EP2021/074683
§ 371 (c)(1),
(2) Date: Dec. 20, 2022

(87) PCT Pub. No.: WO2022/058213
PCT Pub. Date: Mar. 24, 2022

(65) Prior Publication Data
US 2023/0313965 A1    Oct. 5, 2023

(30) Foreign Application Priority Data
Sep. 21, 2020    (DE) .................. 10 2020 124 482.7

(51) Int. Cl.
*F21S 43/243*    (2018.01)
*F21S 43/239*    (2018.01)
*F21S 43/241*    (2018.01)

(52) U.S. Cl.
CPC ........... *F21S 43/243* (2018.01); *F21S 43/239* (2018.01); *F21S 43/241* (2018.01)

(58) Field of Classification Search
CPC ....... F21S 43/239; F21S 43/241; F21S 43/243
See application file for complete search history.

(56) References Cited

U.S. PATENT DOCUMENTS

| 2008/0013333 A1* | 1/2008 | Koizumi ............... F21S 43/239 362/511 |
|---|---|---|
| 2008/0019139 A1 | 1/2008 | Dubosc et al. |

(Continued)

FOREIGN PATENT DOCUMENTS

| DE | 3120753 A1 | 5/1982 |
|---|---|---|
| DE | 10 2012 005 826 A1 | 9/2013 |

(Continued)

OTHER PUBLICATIONS

International Search Report (PCT/ISA/210) issued in PCT Application No. PCT/EP2021/074683 dated Nov. 15, 2021 with English translation (six (6) pages).

(Continued)

*Primary Examiner* — Matthew J. Peerce
(74) *Attorney, Agent, or Firm* — Crowell & Moring LLP

(57) ABSTRACT

A lighting device for a motor vehicle includes a lighting apparatus which has one or more light sources and one or more transparent bodies which each have a surface made of a plurality of flat facets. The lighting device is configured such that light which comes from a light source at least in part passes through a transparent body and is refracted at facets of the transparent body. The light which passes through the transparent body at least in part exits from the lighting device in order to create a light distribution. An associated transparent body is a molded component having one or more recesses which are integrally molded in the molded component, the molded component being clamped in the lighting device by the engagement of one or more projections into the one or more recesses.

17 Claims, 3 Drawing Sheets

(56) References Cited

U.S. PATENT DOCUMENTS

2016/0290618 A1* 10/2016 Eichelberger ............ F21S 43/26
2017/0219178 A1*  8/2017 Faffelberger ............ F21S 43/14
2019/0092216 A1   3/2019 Min et al.

FOREIGN PATENT DOCUMENTS

| | | |
|---|---|---|
| DE | 20 2018 004 425 U1 | 11/2018 |
| DE | 10 2018 201 449 A1 | 8/2019 |
| EP | 1 881 263 A1 | 1/2008 |
| EP | 2 237 080 A1 | 10/2010 |
| EP | 3 190 333 A1 | 7/2017 |
| FR | 2 967 235 A1 | 5/2012 |
| FR | 3 022 980 A1 | 1/2016 |
| GB | 429400 A | 4/1934 |
| KR | 10-2017-0045805 A | 4/2017 |
| WO | WO-2012059852 A1 * | 5/2012 ............ F21S 41/141 |
| WO | WO 2017/036787 A1 | 3/2017 |

OTHER PUBLICATIONS

German-language Written Opinion (PCT/ISA/237) issued in PCT Application No. PCT/EP2021/074683 dated Nov. 15, 2021 (six (6) pages).

German-language Search Report issued in German Application No. 10 2020 124 482.7 dated May 21, 2021 with partial English translation (14 pages).

\* cited by examiner

LIGHTING DEVICE FOR A MOTOR VEHICLE

BACKGROUND AND SUMMARY OF THE INVENTION

The invention relates to a lighting device for a motor vehicle and to a corresponding motor vehicle.

It is known from the prior art to use optical components having facet faces in a motor vehicle lighting device in order to generate a light distribution. For example, WO 2017/036787 A1 describes a vehicle lamp having a transparent optical element that comprises a plurality of facet faces. A plurality of light sources are provided in the vehicle lamp, their light being reflected by the facet faces of the optical element or passing through the optical element.

Optical elements consisting of facet faces have a complex geometrical shape, so that fastening them in a motor vehicle lighting device is difficult and generally requires special finishing of the optical elements.

It is an object of the invention to provide a lighting device for a motor vehicle, which comprises one or more transparent bodies consisting of facets and allows simple fastening of the transparent body or bodies.

This object is achieved by the lighting device of the claimed invention.

The lighting device according to embodiments of the invention is intended for a motor vehicle, the motor vehicle preferably being an automobile, but optionally also a truck or a motorcycle. When interactions between the lighting device and the motor vehicle are described below, and particularly in the patent claims, this is always intended to mean that the interaction takes place when the lighting device is arranged, or installed, in the motor vehicle. The component parts of the lighting device that have a corresponding interaction with the motor vehicle, or components of the motor vehicle, are therefore to be configured in such a way that the interaction is brought about when the lighting device is arranged, or installed, in the motor vehicle.

The lighting device according to embodiments of the invention is preferably a signal lamp for the emission of light into the area around the motor vehicle, that is to say it is used for signaling in the environment of the motor vehicle and not for active illumination of the surroundings, as is the case with a headlamp. Optionally, the lighting device according to embodiments of the invention may also be interior illumination for a motor vehicle.

The lighting device according to embodiments of the invention comprises a lighting apparatus, which has one or more light sources, as well as one or more transparent bodies that respectively have a surface consisting of a plurality of planar, and preferably ground, facets. Preferably, the entire surface of a respective transparent body is in this case formed from facets. A transparent body is intended to mean a body that is formed from a material having a transmissivity of 90% or more, and in particular 95% or more.

The lighting device according to embodiments of the invention is configured in such a way that light emanating from the light source or the light sources of the lighting apparatus at least in part passes through the transparent body or the transparent bodies while being refracted at facets of the transparent body or of the transparent bodies. The light which passes through the transparent body or the transparent bodies at least in part emerges from the lighting device in order to generate a light distribution. Light is intended to mean electromagnetic waves in the visible spectral range.

The lighting device according to embodiments of the invention is distinguished in that a respective transparent body is a molded component having one or more recesses, which are integrally molded in the molded component, the molded component being clamped in the lighting device by engagement of one or more projections into the recess or recesses. In other words, the corresponding recesses were introduced in the scope of the molding of the respective transparent body. The recesses are therefore already formed in the blank that is used for the molding of the corresponding molded component. A separate working step in order to form the recesses, for example a separate milling step, is therefore not required. In the event that the facets of the transparent body are ground, it is merely necessary to grind the facets in a finishing step after the molding of the corresponding transparent body.

Because the recesses are engaged with corresponding projections, very good retention of the respective transparent bodies in the lighting device can further be achieved by clamping in the lighting device according to embodiments of the invention. In this case, the corresponding transparent body is held in the lighting device both by way of a form-fit and by way of a force-fit.

In one particularly preferred embodiment, at least one transparent body, and preferably each of the transparent bodies provided in the lighting device, is configured in such a way that, when the lighting device is installed in the motor vehicle, at least one recess is located on an upper side of the at least one transparent body and/or at least one recess is located on a lower side of the at least one transparent body. If corresponding recesses are provided both on the upper side and on the lower side, each recess on the upper side is preferably offset relative to each recess of the lower side in the transverse direction and, as an alternative or in addition, also in the longitudinal direction of the motor vehicle. With this embodiment, particularly good retention of the corresponding transparent body in the lighting device is ensured.

In another preferred embodiment, at least one transparent body, and preferably each of the transparent bodies provided in the lighting device, is configured in such a way that, when the lighting device is installed in the motor vehicle, the longitudinal direction of at least one elongate recess, and preferably each of the (elongate) recesses present, extends substantially in the transverse direction of the motor vehicle. In this way, the retention of the transparent body during acceleration and braking of the motor vehicle in the longitudinal direction is improved.

In another preferred configuration, at least one transparent body, and preferably each of the transparent bodies present, is arranged between a plurality of plate-shaped elements on which at least one projection for engagement into at least one recess is respectively provided. Preferably, in this case at least one plate-shaped element bears on the upper side of the corresponding transparent body, while at least one other plate-shaped element bears on the lower side of the transparent body. In this case, the transparent body is positioned between the plate-shaped elements in the vertical direction. A plate-shaped element may be a separate component or a subsection of a larger component.

In another preferred configuration, at least one transparent body, and preferably each of the transparent bodies present, has an opaque coating, which is provided in the region of at least one of its recesses and preferably in the region of each recess present, on a part of its outer side. Preferably, this opaque coating is a reflective coating. This embodiment ensures that the fastening of the corresponding transparent body by way of recesses is not visible when viewing the lighting device from the outside.

The transparent bodies installed in the lighting device may be configured in a variety of ways. In one variant, at least one transparent body, and optionally also each transparent body present, is formed from glass, and preferably from crystal glass. As an alternative or in addition, at least one transparent body, and optionally also each transparent body present, may be formed from plastic.

In one preferred embodiment, at least one light source, and optionally also each light source of the lighting apparatus, is a polychromatic light source, and in particular a white light source, the light of which is spectrally broken up by way of light refraction at facets of at least one transparent body of the transparent bodies present and subsequently emerges from the lighting device. In this way, an optically appealing light distribution with a rainbow effect is generated.

In another particularly preferred embodiment, a respective light source of the lighting apparatus is a substantially point light source. Preferably, a respective point light source is an LED unit consisting of one or more LEDs (for example an RGB LED unit) or a laser light source consisting of one or more laser diodes (for example an RGB laser light source). If the LED unit, or the laser light source, contains a plurality of LEDs or laser diodes, these are arranged close to one another in such a way that the point-like nature of the light sources is maintained.

In another embodiment, the lighting apparatus of the lighting device can be operated in one or more operating modes, light for a light function that is assigned to the respective operating mode being provided in a respective operating mode. The light function need not in this case necessarily be produced only by the light of the lighting apparatus. Optionally, at least one further lighting apparatus that provides the light for the corresponding light function may also be provided.

In one preferred variant of the embodiment just described, the operating mode or the operating modes comprise one or more of the following operating modes:
- an operating mode for providing a flashing light as a light function;
- an operating mode for providing a daytime running light as a light function;
- an operating mode for providing a position light as a light function;
- an operating mode for providing a lighting effect before starting or after parking of the motor vehicle.

The operating mode mentioned last may be coupled with various events. For example, the lighting effect may be started when a user approaching the motor vehicle is detected. The lighting effect may likewise be initiated by a user unlocking or locking the motor vehicle.

In another preferred configuration, the lighting apparatus comprises one or more lighting groups respectively consisting of one or more light sources, the light source or the light sources of a lighting group respectively emitting light with the same color and the light sources of different groups emitting light with a different color. A color may in this case also be a mixture of a plurality of spectral colors, which is for example the case with white light. This variant of the invention is preferably combined with the embodiment described above that relates to the operation of the lighting apparatus in various operating modes. In this case, one lighting group is assigned to each operating mode, only the light source or the light sources of the assigned lighting group being turned on in the respective operating mode. For example, one lighting group may consist of one or more light sources with a yellow light color, which is turned on in order to produce a flashing light, while another lighting group consists of white light sources, which are for example activated in order to provide a daytime running light or position light.

In another configuration of the lighting device according to the invention, the lighting apparatus and the one or more transparent bodies are accommodated in a common housing, which has a transparent lens for the light emission. In this way, a lighting module that can be installed flexibly at different positions in the motor vehicle is formed by the lighting device.

As already mentioned above, at least one further lighting apparatus, which is for example additionally used to produce a corresponding light function, may also be installed in the lighting device according to embodiments of the invention besides the lighting apparatus consisting of one or more light sources. In one embodiment, a further lighting apparatus in the form of a light guide, from which light of a corresponding light source is extracted for example for a daytime running light, is provided.

In another preferred embodiment, the lighting device according to the invention is configured to be installed above a vehicle headlamp in the vertical direction. The lighting device therefore represents a suitable addition to the headlamp light (that is to say low beam and high beam) and may, for example, provide the light function of the flashing light and/or daytime running light and/or position light.

The invention furthermore includes a motor vehicle that comprises one or more of the lighting devices according to embodiments of the invention, or one or more preferred variants of the lighting device according to the invention.

An exemplary embodiment of the invention will be described in more detail below with the aid of the appended figures.

DETAILED DESCRIPTION OF THE DRAWINGS

An embodiment of a lighting device according to the invention will be described below with the aid of a vehicle signal lamp 1. The vehicle signal lamp is in this case installed above a left front headlamp (not shown) of a motor vehicle. According to the coordinate system represented in all figures, the x axis represents the driving direction in which the motor vehicle moves forward when driving straight ahead. This direction extends along the longitudinal axis of the motor vehicle. Conversely, the y is the transverse direction of the motor vehicle and the z direction is the vertical direction, or height direction.

Figure 1:
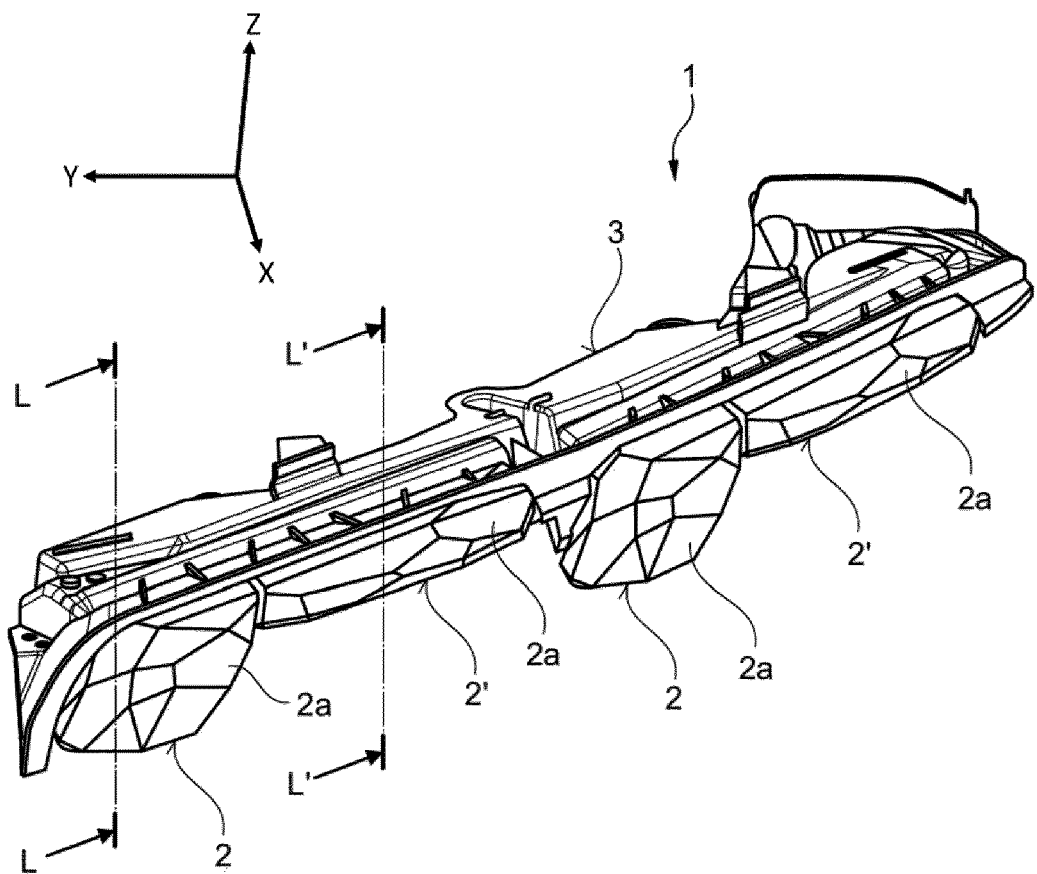
FIG. 1 shows a perspective representation of a variant of a lighting device according to the invention, seen from above.
Figure 2:
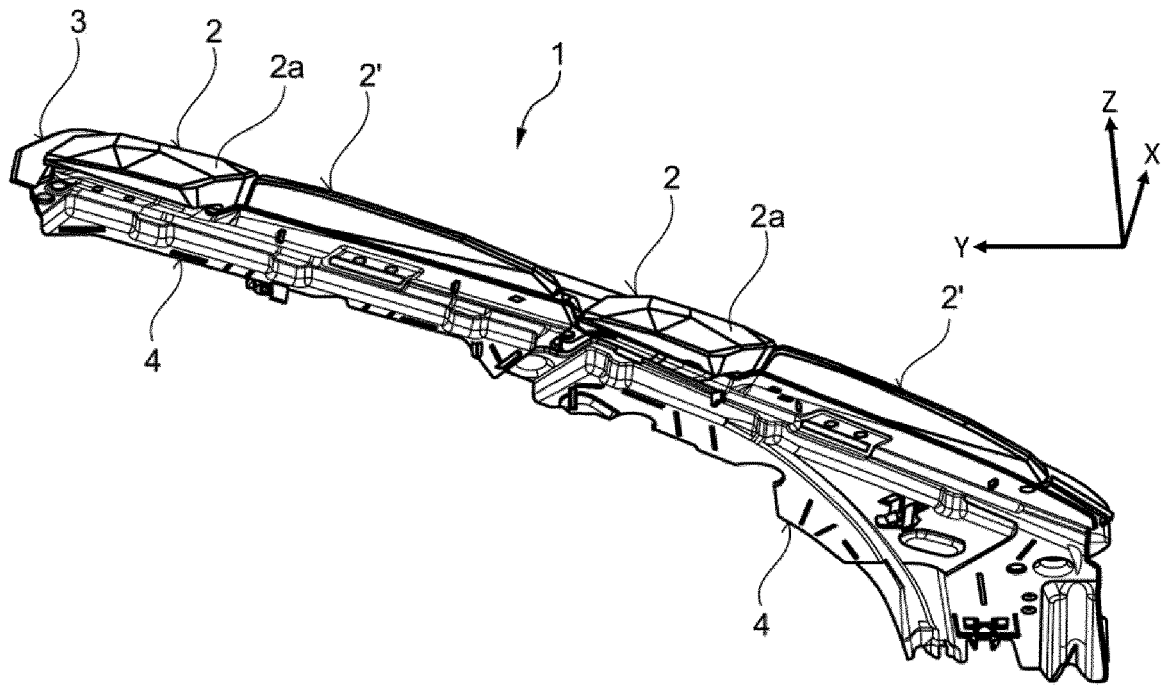
FIG. 2 shows a perspective representation of the lighting device of FIG. 1, seen from below.

FIG. 1 shows a perspective view from above of the constituent parts of the vehicle signal lamp 1 that are essential to embodiments of the invention. The component parts represented are in this case accommodated together in a housing (not represented), which is bounded at the front by a transparent cover lens (likewise not shown). Inside the housing, there are two pairs of transparent bodies 2, 2', which in the embodiment described here are crystal glass bodies. Each of the pairs of crystal glass bodies comprises a bulbous crystal glass body 2 and an elongate crystal glass body 2' arranged next to the latter. All the crystal glass bodies have a plurality of facets 2a on their outer side, only some of which are provided with this reference for reasons of clarity. Above the four crystal glass bodies 2, 2', there is a continuous cover component 3. On the other hand, two carrier components 4 are provided on the lower side of the crystal glass bodies, one carrier component lying below one pair of the crystal glass bodies and the other carrier component lying below the other pair of crystal glass bodies, as may be seen from the perspective view of FIG. 2.

Figure 3:
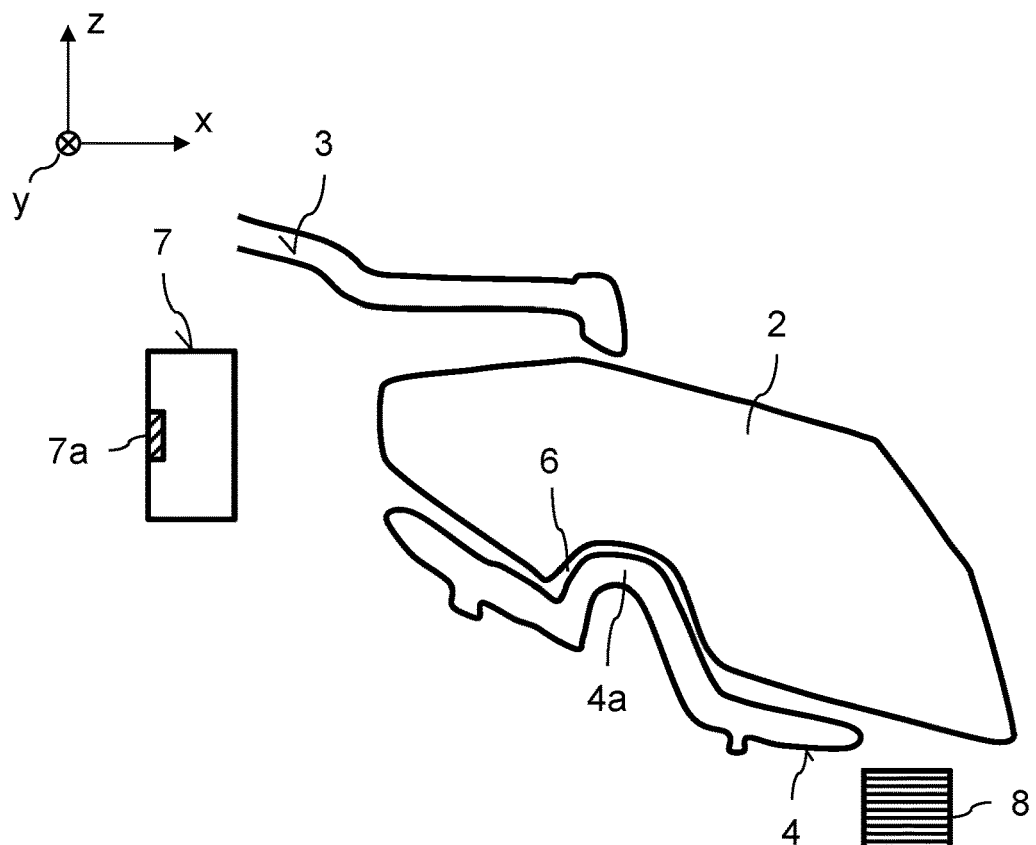
FIG. 3 shows a cross section along the line L-L of FIG. 1.
Figure 4:
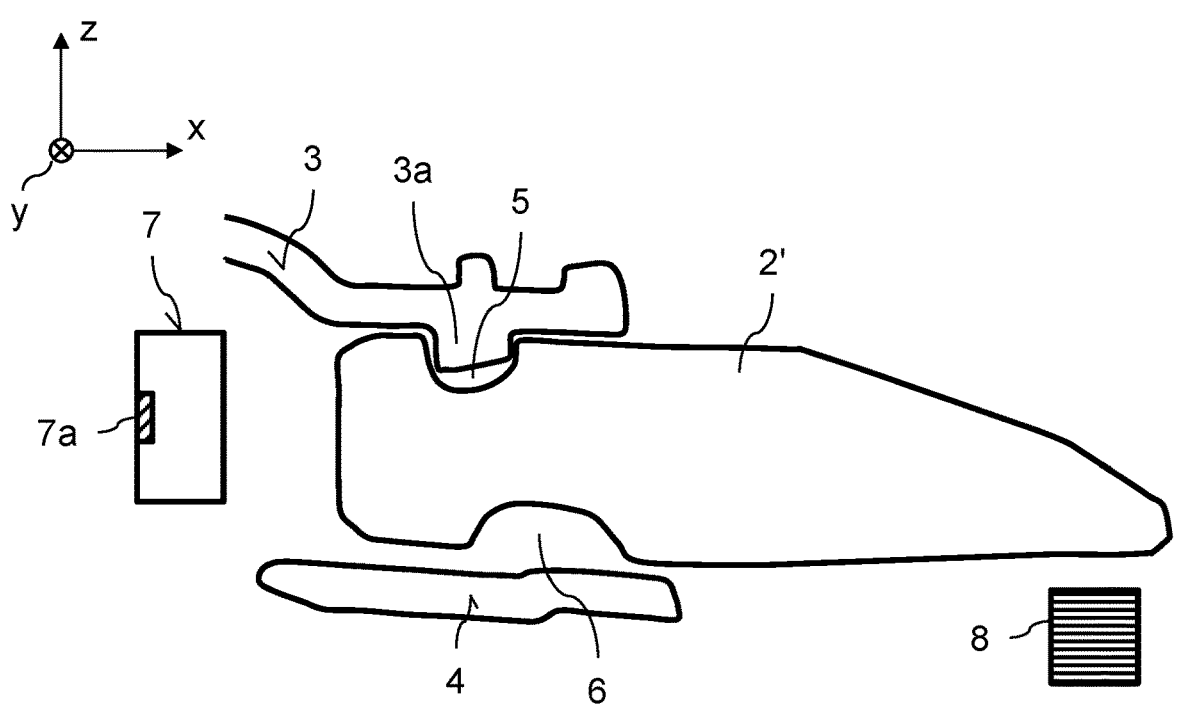
FIG. 4 shows a cross section along the line L'-L' of FIG. 1.

Behind the crystal glass bodies, a lighting apparatus 7 that may be seen from the cross-sectional views of FIG. 3 and FIG. 4 extends in the y direction. The lighting apparatus is not essential for embodiments of the invention. It is therefore indicated only schematically in FIG. 3 and FIG. 4. The lighting apparatus 7 comprises a plurality of LEDs 7a, of which a single LED is likewise indicated only schematically in FIG. 3 and FIG. 4. Along the extent of the lighting device in the y direction, a plurality of LEDs 7a are arranged next to one another. In this case, a white light LED alternates with a yellow LED. For example, ten or more white light LEDs and a corresponding number of yellow LEDs may be provided. The lighting apparatus 7 with the LEDs 7a emit light into the respective crystal glass bodies 2 and respectively 2' from behind. This light passes through the crystal glass bodies 2 and respectively 2' and is then reflected and refracted. A part of the light guided through the crystal glass bodies is emitted outward through the cover lens (not shown) of the lighting device.

The LEDs 7a of the vehicle signal lamp 1 may be used both to provide a flashing light and to provide a part of the daytime running light. For the flashing light, only the yellow LEDs among the LEDs 7a are turned on and off with a predetermined frequency. At the same time, yellow light is delivered at the predetermined frequency into a light guide 8, which is arranged below the four crystal glass bodies in the housing of the vehicle signal lamp 1 and can be seen from FIG. 3 and FIG. 4. The yellow light of the LEDs shines into the four crystal glass bodies 2, 2', the crystal glass bodies then starting to shine in the color yellow because of the ground facets 2a. An optically appealing flashing light is thereby generated.

If, on the other hand, a part of the daytime running light function is being produced by the LEDs, only the white light LEDs are turned on. The light of these LEDs again enters the four crystal glass bodies 2, 2', the ground facets 2a leading to a spectral breakup of the white light so that an appealing light distribution with a rainbow effect is generated by the crystal glass bodies. When the daytime running light is activated, white light is furthermore delivered into the light guide 8. The daytime running light therefore also comprises the illuminating light guide 8.

One essential feature of the vehicle signal lamp 1 is the fastening of the crystal glass bodies 2 and respectively 2' by clamping in the interior of the lamp. For this purpose, recesses or grooves 5, 6 are provided on the upper side and lower side in each of the crystal glass bodies 2, 2', as may be seen from the perspective representations of FIG. 5 and FIG. 6. The individual crystal glass bodies are in this case molded components, in which the corresponding grooves are integrally molded, that is to say the grooves are already a constituent part of the blank used for the molding. This has the advantage that a separate working step in order to form the grooves in the corresponding crystal glass bodies is not required. Furthermore, the grooves are transparently clear and not transparently matt, as is the case for example with milled grooves. In this way, the optical properties of the crystal glass body are improved.

Figure 5:
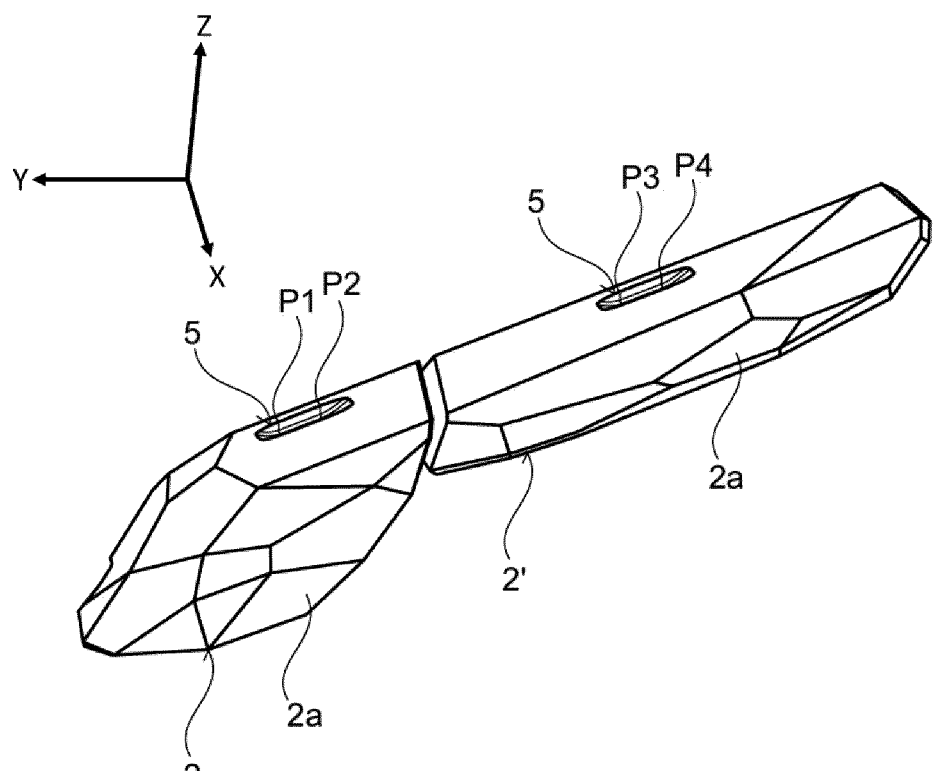
FIG. 5 shows a perspective view of a pair of transparent bodies of the lighting device of FIG. 1, seen from above.

It may be seen from FIG. 5 that two grooves 5 are formed in the respective upper sides of the two crystal glass bodies 2 and 2'. The longitudinal direction of the grooves 5 extends in the transverse direction (that is to say the y direction) of the motor vehicle, the bottom of the grooves extending from the respective ends in the y direction obliquely downward to a central section with the maximum depth. Projections 3a (see FIG. 4) that are provided in the cover component 3, on the lower side of the latter, engage in the grooves 5. The projections are in this case located approximately at the positions P1, P2, P3 and P4 of FIG. 5. By way of example, one of the projections 3a may be seen from the sectional view of FIG. 4. This figure corresponds to a section along the line L'-L' (that is to say along the x-z plane) of FIG. 1 at the position P4 of FIG. 5. As shown in FIG. 4, the projection 3a is arranged in the groove 5 of the elongate crystal body 2'. The further groove 6 described below on the lower side of the crystal body 2' may also be seen from FIG. 4. At the position P4, which corresponds to the sectional view of FIG. 4, no projection in this case engages into the groove 6.

Figure 6:
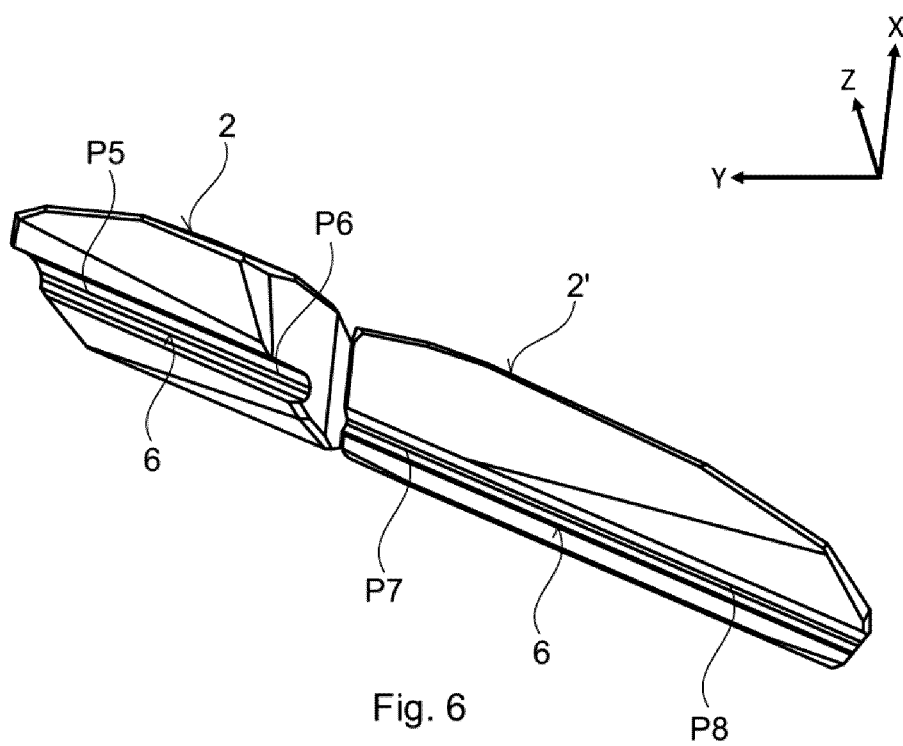
FIG. 6 shows a perspective view of the pair of transparent bodies of FIG. 5, seen from below.

The lower sides of the corresponding crystal glass bodies 2 and 2' may be seen from FIG. 6. As is shown, there are continuous grooves 6 on the lower sides of the two crystal glass bodies, which extend in the transverse direction of the motor vehicle (that is to say in the y direction) over the entire length of the respective crystal glass bodies 2 or 2'. Projections 4a (see FIG. 3) that are provided in the carrier component 4, on the upper side of the latter, in turn engage into these grooves. The projections are in this case located approximately at the positions P5, P6, P7 and P8 of FIG. 6. By way of example, one of the projections 4a may be seen from the sectional view of FIG. 3. This sectional view is a section along the line L-L (that is to say along the x-z plane) of FIG. 1 at the position P5 of FIG. 6. As shown in FIG. 3, the projection 4a, which is configured as a curved segment in the carrier component 4, is positioned in the groove 6 of the crystal glass body 2. Conversely, no recess and no groove are provided on the upper side of the crystal glass body 2 at the position P5, which corresponds to the sectional view of FIG. 3.

By the engagement of corresponding projections 3a and respectively 4a into the grooves 5 and respectively 6, the crystal glass bodies 2 and 2' are clamped between the cover component 3 and the carrier component 4. The retention of the crystal glass bodies 2 and 2' is in this case achieved both by a form-fit and by a force-fit. The crystal glass bodies may therefore be retained straightforwardly in the interior of the lighting device, without additional fasteners needing to be provided for this purpose.

The embodiment described above has a number of advantages. In particular, a vehicle signal lamp that is constructed compactly and allows the generation of various light functions with one or more light sources is provided. The crystal glass bodies used for this purpose, with ground facets, are in this case clamped straightforwardly in the lighting device. For this clamping, recesses that are molded integrally into the crystal glass bodies are provided. That is to say, the recesses are formed toollessly (that is to say without an additional tool) in the scope of the molding of the crystal glass bodies. A separate working step in order to form the corresponding recesses in the crystal glass bodies is therefore not required. By the engagement of corresponding projections into the recesses, very good retention of the crystal glass bodies in the interior of the lighting device by way of a form-fit and force-fit may be achieved.

LIST OF REFERENCES 1 lighting device
2, 2' transparent bodies
2a facets of the transparent bodies
3 cover component
3a projection in the cover component
4 carrier component
4a projection in the carrier component
5, 6 recesses
7 lighting apparatus
7a light source
8 light guide
L-L section line
L'-L' section line
x, y, z coordinates
P1, P2, . . . , P8 positions of projections

The invention claimed is:

1. A lighting device for a motor vehicle, the lighting device comprising:
a lighting apparatus which has one or more light sources and one or more transparent bodies, each of which has a surface consisting of a plurality of planar facets, wherein:
the lighting device is configured such that light emanating from the one or more light sources of the lighting apparatus at least in part passes through the one or more transparent bodies while being refracted at facets of the one or more transparent bodies,
the light which passes through the one or more transparent bodies at least in part emerges from the lighting device in order to generate a light distribution,
a respective transparent body of the one or more transparent bodies is a molded component having one or more recesses, which are integrally molded in the molded component, the molded component being clamped in the lighting device by engagement of one or more projections into the one or more recesses, and
a first light source of the one or more light sources is a polychromatic light source, and light of the polychromatic light source is spectrally broken up by light refraction at facet of a first transparent body of the one or more transparent bodies and subsequently emerges from the lighting device.

2. The lighting device according to claim 1, wherein a first transparent body of the one or more transparent bodies is configured such that, when the lighting device is installed in the motor vehicle, a first recess of the one or more recesses is located on an upper side of the first transparent body and/or a second recess of the one or more recesses is located on a lower side of the first transparent body.

3. The lighting device according to claim 2, wherein the first recess on the upper side is offset relative to the second recess on the lower side in a transverse direction and/or a longitudinal direction of the motor vehicle.

4. The lighting device according to claim 1, wherein a first transparent body of the one or more transparent bodies is configured such that, when the lighting device is installed in the motor vehicle, a longitudinal direction of a first recess of the one or more recesses, which is configured as an elongate recess, extends substantially in a transverse direction of the motor vehicle.

5. The lighting device according to claim 1, wherein a first transparent body of the one or more transparent bodies is arranged between a plurality of plate-shaped elements on which at least one projection for engagement into a first recess of the one or more recesses is provided.

6. The lighting device according to claim 1, wherein a first transparent body of the one or more transparent bodies has an opaque coating, which is provided in a region of a first recess of the one or more recesses on a part of an outer side of the first recess.

7. The lighting device according to claim 1, wherein a first transparent body of the one or more transparent bodies is formed from glass, and/or a second transparent body is formed from plastic.

8. The lighting device according to claim 7, wherein the first transparent body is formed from crystal glass.

9. The lighting device according to claim 1, wherein a first light source of the one or more light sources is a substantially point light source.

10. The lighting device according to claim 9, wherein the first light source is an LED unit consisting of one or more LEDs or a laser light source consisting of one or more laser diodes.

11. The lighting device according to claim 1, wherein the lighting apparatus is operable in one or more operating modes, light for a light function that is assigned to a respective operating mode being provided in the respective operating mode.

12. The lighting device according to claim 11, wherein the one or more operating modes comprise at least one of:
a first operating mode for providing a flashing light as a first light function;
a second operating mode for providing a daytime running light as a second light function;
a third operating mode for providing a position light as a third light function; or
a fourth operating mode for providing a lighting effect before starting or after parking of the motor vehicle.

13. The lighting device according to claim 1, wherein the lighting apparatus comprises one or more lighting groups, each consisting of one or more of the light sources, one or more light sources of a first lighting group emitting light with a same color and one or more light sources of different lighting groups emitting light with a different color.

14. The lighting device according to claim 13, wherein:
the lighting apparatus is operable in one or more operating modes, light for a light function that is assigned to a respective operating mode being provided in the respective operating mode; and
a lighting group of the one or more lighting groups is assigned to each operating mode of the one or more operating modes and, in a respective operating mode, only the one or more light sources of the assigned lighting group are turned on.

15. The lighting device according to claim 1, wherein the lighting apparatus and the one or more transparent bodies are accommodated in a common housing, which has a transparent lens for the light emission.

16. The lighting device according to claim 1, further comprising at least one further lighting apparatus.

17. A motor vehicle comprising the lighting device according to claim 1.

\* \* \* \* \*